(12) United States Patent
Clayton et al.

(10) Patent No.: US 9,252,922 B2
(45) Date of Patent: Feb. 2, 2016

(54) SYSTEM AND METHOD FOR IMPROVED ERROR RESPONSE IN DATA MIRRORING

(71) Applicant: INTERNATIONAL BUSINESS MACHINES CORPORATION, Armonk, NY (US)

(72) Inventors: Nicolas M. Clayton, Cheshire (GB); Theodore T. Harris, Jr., Tucson, AZ (US); Gail A. Spear, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 316 days.

(21) Appl. No.: 13/736,431

(22) Filed: Jan. 8, 2013

(65) Prior Publication Data

US 2014/0195871 A1 Jul. 10, 2014

(51) Int. Cl.
*G06F 11/00* (2006.01)
*H04L 1/08* (2006.01)
*H04L 1/22* (2006.01)

(52) U.S. Cl.
CPC ... *H04L 1/08* (2013.01); *H04L 1/22* (2013.01)

(58) Field of Classification Search
CPC ............ G06F 11/1469; G06F 11/1456; G06F 11/2071; G06F 11/2097; H04L 1/08; H04L 1/1812; H04L 1/188; H04L 1/22
USPC .................................. 714/6.3, 749
See application file for complete search history.

(56) References Cited

U.S. PATENT DOCUMENTS

| | | | |
|---|---|---|---|
| 6,658,590 B1 * | 12/2003 | Sicola et al. | 714/6.21 |
| 7,035,937 B2 | 4/2006 | Haas et al. | |
| 7,633,955 B1 * | 12/2009 | Saraiya et al. | 370/401 |
| 2005/0114566 A1 | 5/2005 | Chen et al. | |
| 2009/0003378 A1 * | 1/2009 | Sachs | H04L 1/16 370/466 |
| 2011/0085440 A1 | 4/2011 | Owens et al. | |
| 2014/0269269 A1 * | 9/2014 | Kovvali | H04W 24/08 370/229 |

* cited by examiner

*Primary Examiner* — Yair Leibovich
(74) *Attorney, Agent, or Firm* — Griffiths & Seaton PLLC

(57) ABSTRACT

Systems and methods are provided to improve performance in backup data storage systems by improving response to errors. The system and method provide for transferring data from a primary storage controller to a secondary storage controller, where the secondary storage controller is linked to the primary storage controller by a plurality of links. The system and method includes transmitting a first transaction from the primary storage controller to the secondary storage controller using a first of a plurality of links. Then, in response to the first transaction crossing a first timeout boundary without completing, the system and method includes transmitting a second transaction from the primary storage controller to the secondary storage controller using a second of the plurality of links, the second of the plurality of links preferentially selected to be on a different network failure boundary from the first of the plurality of links.

17 Claims, 2 Drawing Sheets

400

SYSTEM AND METHOD FOR IMPROVED ERROR RESPONSE IN DATA MIRRORING

BACKGROUND OF THE INVENTION

1. Field of the Invention

The present invention relates in general computing systems, and more particularly to, systems and methods for improved response times in computing storage environments.

2. Description of the Related Art

In today's society, computer systems are commonplace. Computer systems may be found in the workplace, at home, or at school. Computer systems may include data storage systems, or disk storage systems, to process and store data. Data integrity is a critical factor in large computer data systems. Consequently, backup data storage systems have been developed to prevent the loss of data in the event of various types of failures. Typically backup systems generally referred to as "synchronous mirroring" or more specifically as "peer-to-peer remote copy" (PPRC), maintain a separate, consistent copy of data. In general, in such systems data generated by a host device is stored on a primary storage unit. A copy of the data is also transmitted synchronously over a mirroring network and stored on a secondary storage unit. Because of the flexibility of network interconnections, the primary and secondary storage units may be physically located remote from the host. And, for additional data security, the primary and secondary storage units may be physically located distant from each other, thereby reducing the likelihood of a single disaster simultaneously harming both the primary and secondary units.

One issue in such backup systems is the ability to meet stringent input/output (I/O) response time requirements in addition to providing high availability. This is a particular issue where the secondary storage units are located relatively large distances from the primary storage units. While synchronous mirroring often occurs over very short network distances (campus distances of 10 km or less), in some applications longer distances of up to 100 km between primary and secondary storage units are increasingly common. In these systems failure of the mirroring network (including partial, intermittent, or complete failures) are more likely, especially as the mirroring networks become more complex or when the mirroring networks use shared or leased components. However, even at shorter distances the network components (e.g., physical fibre optic links, switches, routers, etc.) can fail or become congested.

Network failure can result in increased host response time, especially in synchronous mirroring environments, since the host writes are delayed by the completion of the mirrored write. If significant time is spent waiting for these mirrored writes to complete (due to timeouts, retry on alternate paths etc.), the normal response times can increase to multiple seconds, which is intolerable for many response time sensitive applications. Thus, what are needed are improved systems and methods for mirroring, and in particular for responding to errors in network mirroring.

SUMMARY OF THE INVENTION

Systems and methods are provided to improve performance in backup data storage systems. In particular, for improving response to errors in data mirroring storage systems. In one example, a method is provided for transferring data from a primary storage controller to a secondary storage controller, where the secondary storage controller is linked to the primary storage controller by a plurality of links. The method includes transmitting a first transaction from the primary storage controller to the secondary storage controller using a first of a plurality of links, where the plurality of links includes at least two links implemented with at least one different component such that the at least two links are on different network failure boundaries. Then, in response to the first transaction crossing a first timeout boundary without completing, the method includes transmitting a second transaction from the primary storage controller to the secondary storage controller using a second of the plurality of links, the second of the plurality of links preferentially selected to be on a different network failure boundary from the first of the plurality of links. Preferentially selecting links on a different network failure boundary for the transmitting of additional transactions can improve the performance of the system by decreasing the probability of delay in the completing these additional transactions.

In another example, a storage system is provided that includes a primary storage controller, a secondary storage controller, and a plurality of links linking the primary storage controller to the secondary storage controller, where the plurality of links includes at least two links implemented with at least one different component such that the at least two links are on different network failure boundaries. In this example the primary storage controller is configured to, in response to the first transaction crossing a second timeout boundary without completing, transmit a first transaction from the primary storage controller to the secondary storage controller using a second of the plurality of links, the second of the plurality of links preferentially selected to be on a different network failure boundary from the first of the plurality of links. Again, preferentially selecting links on a different network failure boundary for the transmitting of additional transactions can improve the performance of the system by decreasing the probability of delay in the completing these additional transactions. This is particularly true for systems where the secondary storage systems used for mirroring backup are relatively large distances from the primary storage systems.

Other system, controller and method embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

The embodiments described herein provide devices and methods to improve performance in backup data storage systems, and in particular, data mirroring systems. For example, a storage system is provided that includes a primary storage controller, a secondary storage controller, and a plurality of links linking the primary storage controller to the secondary storage controller, where the plurality of links includes at least two links implemented with at least one different component such that the at least two links are on different network failure boundaries. In this example the primary storage controller is configured to, in response to the first transaction crossing a first timeout boundary without completing, transmit a second transaction from the primary storage controller to the secondary storage controller using a second of the plurality of links, the second of the plurality of links preferentially selected to be on a different network failure boundary from the first of the plurality of links. Preferentially selecting links on a different network failure boundary for the transmitting of additional transactions can improve the performance of the system by decreasing the probability of delay in the completing these additional transactions. This is particularly true for systems where the secondary storage systems used for mirroring backup are relatively large distances from the primary storage systems.

Figure 1:
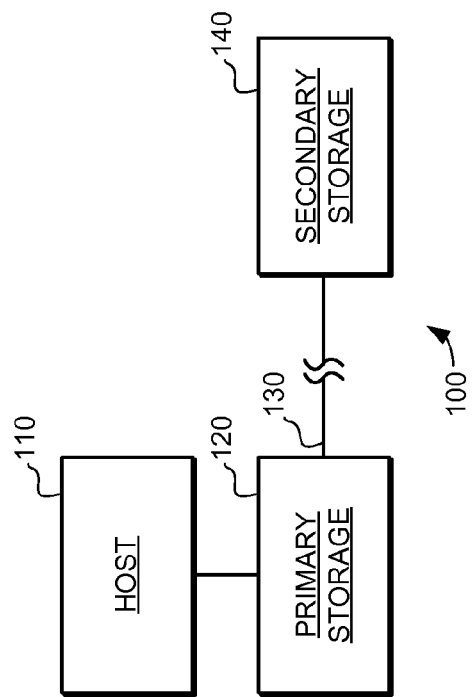
FIG. 1 is a block diagram of an exemplary data storage system.

Turning now to FIG. 1, a schematic view of a synchronous mirroring system 100 is illustrated. In system 100 data generated by a host device 110 is stored on a primary storage unit 120. A copy of the data is also transmitted synchronously over a mirroring network 130 and stored on a secondary storage unit 140. The mirroring network includes a plurality of links, where the plurality of links includes at least two links implemented with at least one different component such that the at least two links are on different network failure boundaries. To implement these links, the mirroring network 130 can comprise a variety of different types of network connections, including fibre channel networks, internet protocol networks, etc. Because of the flexibility of network interconnections, the primary and secondary storage units 120 and 140 may be physically located remote from the host 110. And, for additional data security, the primary and secondary storage units 120 and 140 may be physically located distant from each other, thereby reducing the likelihood of a single disaster simultaneously harming both the primary and secondary storage units 120 and 140.

In general, the transferring of data from the primary storage unit 120 to the secondary storage unit 140 is done by a series of transactions over the plurality of links. During a typical mirroring operation, a block of data to be copied to the secondary unit 140 is first received by the primary unit 120. The first data block is then associated with a thread or other operating system unit of execution, such as a thread or process and transferred from the primary unit to the secondary over one of the links. This action of transferring a block of data to the secondary storage unit is generally referred to as a transaction. Upon successful receipt of the track, the secondary storage unit replies with a "complete" status message. The thread or process is then released and the next data block may then be associated with the thread or process and transferred to the secondary in the next transaction. Additional transactions are then performed until all of the data blocks have been successfully transferred to the secondary storage unit 140.

Figure 2:
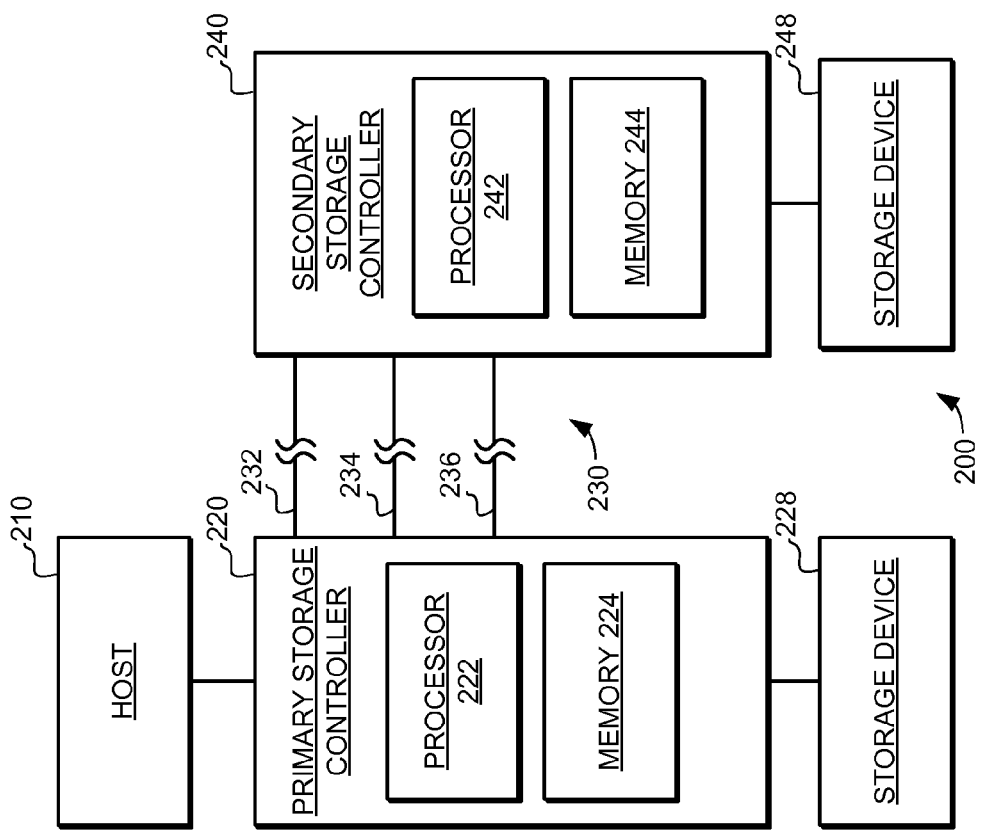
FIG. 2 is a block diagram showing an exemplary data storage system that includes in accordance with the embodiments described herein.

FIG. 2 is a block diagram of an exemplary data storage system 200 in which the present invention may be implemented. The system 200 may be a peer-to-peer remote copy (PPRC) system in which a host device 210 transmits data to a primary storage controller 220 for storage on a storage device (such as an array of disk drives) 228. Additionally, the primary storage controller 220 transfers a copy of the data to a secondary storage controller 240, such as over a network 230, for storage on a storage device 248. The secondary storage controller 240 and storage device 248 may be, but not necessarily, located remote from the primary storage controller 220. The primary storage controller 220 further includes a processor 222 for executing instructions relating to the transfer of the copies of data to the secondary storage controller 240. The primary storage controller 220 also includes a memory 224, portions of which are allocated to tasks, threads or other operating system units of execution, such as task control blocks. The secondary storage controller 240 also includes a processor 242 to execute instructions relating to the receipt and ultimate storage of data. The secondary storage controller 240 also includes a memory 244, portions of which are allocated to tasks, threads or other operating system units of execution, such as task control blocks.

The network 230 preferably includes a plurality of links 232, 234 and 236 through which data and messages may be transferred between the primary and secondary storage controllers 220 and 240. Although three such links 232, 234 and 236 are shown in FIG. 2, it will be appreciated that any number of links may be provided. The network 230 and the links 232, 234 and 236 are illustrated as directly connecting the primary storage controller 220 and the secondary storage controller 230. However, it will be appreciated that such a depiction is merely for clarity in FIG. 2 and that the illustrated network 230 and links 232, 234 and 236 represent any path, direct or indirect, by which the primary storage controller 220 and the secondary storage controller 230 may be coupled.

As noted above, the plurality of links 232, 234 and 236 includes at least one link on a different network failure boundary from another link in the plurality of links 232, 234 and 236. With at least two links on different network failure boundaries, the primary controller can preferentially select links on different network failure boundaries in response to transactions failing to properly complete (e.g., crossing various timeout boundaries without completing). In this application a link on a different "network failure boundary" is defined as a link that includes at least one physical component that is different from the other link. For example, two links using different switches are on different network failure boundaries. As another example, two links using different routers, different interswitch links, different switch ports, completely different networks, different Dense Wave Division Multiplexors (DWDM), etc.

During operation of a typical mirroring system, a block of data at the host 210 is transferred to the primary storage controller 220 to be stored in the storage device 228. To mirror that block of data in the secondary storage device 248 a peer-to-peer remote copy (PPRC) write command is issued by the primary storage controller 220. The PPRC write command uses threads or processes to copy the block of data to the secondary storage controller 240. Each block of data is allocated to a thread or process that is used to transmit the track to the secondary storage controller 240 by directing the transfer of the tracks over one of the links between the primary and secondary storage controller.

At the secondary storage control controller 240, the tracks are received, an acknowledgment is transmitted to the primary storage controller 220, and then acknowledgement is transmitted to the host 210, thereby completing the write operation.

When a PPRC write command transaction is initiated the primary storage controller 220 tracks completion of the transaction against one or more timeout boundaries. In general, timeout boundaries specify the amount of time a transaction is given to process before acknowledgement is received from the secondary storage controller 240, and in the absence of this acknowledgement, some other action is taken. For example, the amount of time a transaction is given to complete before it is retried or failed. In the embodiments described herein, several timeout boundaries are used to determine when certain actions are taken by the primary storage controller 220 in response to possible errors in the mirroring transaction. For example, to determine how a second transaction is to be transmitted from the primary storage controller to the secondary storage controller in response to delays or other errors that delay or prevent the first transaction from completing. Or, as a second example, when a first transaction is to be retransmitted on a different link in a different network failure boundary in response to delays or other errors that prevent the first transaction from completing. It should be noted that in implementing such timeout boundaries any suitable timing device and technique could be used.

As was noted above, the primary storage controller 220 is coupled to the secondary storage controller 240 by a plurality of links 232, 234 and 236 that includes at least one link on a different network failure boundary from another link in the plurality of links 232, 234 and 236. It is through these links that the primary storage controller 240 mirrors data to the secondary storage controller 240 for backup through a series of transactions. In a first embodiment the primary storage controller is configured to, in response to the first transaction crossing a first timeout boundary without completing, transmit a second transaction from the primary storage controller to the secondary storage controller using a second of the plurality of links, the second of the plurality of links preferentially selected to be on a different network failure boundary from the first of the plurality of links. Preferentially selecting links on a different network failure boundary for the transmitting of additional transactions can improve the performance of the system by decreasing the probability of delay in the completing these additional transactions. For example, where the first transaction has been delayed due to some error in the first link preferentially selecting a link on a different network failure boundary will increase the probability that the second transaction timely completes, as the new link on another network failure boundary is less likely to be affected by the same type of delay as impacted the first transaction on the first link. Thus, the performance of the mirroring backup system is improved. This is particularly true for systems where the secondary storage systems used for mirroring backup are relatively large distances from the primary storage systems, as those types of systems are more likely to be affected by errors in the network components between systems.

It should be noted that in such a system it might be desirable to use a relatively short timeout value for the first timeout boundary. This allows the primary storage controller 220 to use different links on another network failure boundary whenever even a relatively short delay occurs. In some cases it will be desirable to identify links that repeatedly cross this first timeout boundary as having a high failure rate, and in some cases suspending mirroring if all available links (or one link per failure boundary) are either failed or are exhibiting a high failure rate.

For example, in a typical system normal completion time would be on the order of milliseconds or sub-millisecond at short distances. Generally, times from 10 milliseconds to 1 second would generally be considered "delayed". In such a system the first timeout boundary could be set to 0.5 seconds or even 250 milliseconds. Of course, these are just examples and other implementations may use different values.

In another embodiment the primary storage controller 220 is configured to, in response to the first transaction crossing a second timeout boundary without completing, retransmit the first transaction from the primary storage controller 220 to the secondary storage controller 240 using the second of the plurality of links, the second of the plurality of links preferentially selected to be on a different network failure boundary from the first of the plurality of links. In this embodiment the primary storage controller 220 is preferentially selecting another link for the retry of the first transaction. Like the first embodiment, retransmitting the transaction on a different link on another network failure boundary increases the probability that the retry will be successful. In general the second time boundary used to determine if a retry is attempted on another link is selected to avoid undesirable performance delays. For example, in a typical system the timeout boundary (e.g., the boundary at which the operation is considered failed or "timed out") can be set on the order of 1 to 2 seconds. Again, this is just an example and other values are possible.

It should be noted that in a typical implementation the primary storage controller 220 would be configured to continue retrying by retransmitting on new links on different network failure boundaries until all links have been tried. Thus, the primary storage controller 220 may be further configured to, in response to the retransmitting of the first transaction again crossing the second timeout boundary without completing, continue to retransmit the first transaction from the primary storage controller 220 to the secondary storage controller 240 using selected other of the plurality of links, the links selected to try one link in each network failure boundary. When a retransmission on a link in each network failure boundary has been attempted and failed, the primary storage controller 220 can then assume that network has been comprised and mirroring of the data to the secondary storage 248 can be reasonably suspended. To facilitate this, the primary storage controller 220 may be configured to suspend transferring data from a primary storage controller 220 to a secondary storage controller 240 after one link in each network failure boundary has been tried for retransmission.

Again, preferentially selecting links on a different network failure boundary for the retransmitting of the first transaction can improve the performance of the system by decreasing the probability of delay in the completing these additional transactions. And continuing by retransmitting once on each network failure boundary before suspending mirroring ensures that reasonable attempts at retransmission are made but the system is not unduly delayed by continuing to retry transmissions on links that are unlikely to work at the detriment of response time. Again, this can avoid degradations in overall system performance and is particularly applicable, but not limited, to systems where the secondary storage systems used for mirroring backup are relatively large distances from the primary storage systems.

In some cases it can be determined that the transactions reached the secondary storage controller 240 but that they failed to timely complete the mirroring operation on the secondary storage device 248. For example, when the secondary storage controller 240 provides an error message to the primary storage controller 220 that indicates that conditions at the secondary storage controller are causing a delay. In such a case it will not generally be advantageous to simply retry transmission of the transaction, on other links on a different network failure boundary. In these cases it will instead be more advantageous to retry transmission on the original link while allowing for greater delay to allow the secondary storage system to complete the transaction. To facilitate this, the primary storage controller 220 is configured to, in response to an indication that the first transaction reached the secondary storage controller 240 but failed to complete, retransmit the first transaction from the primary storage controller 220 to the secondary storage controller using the first of the plurality of links and using a third timeout boundary, where the third timeout boundary is longer than the first or second timeout boundary. Attempting to retry on the same link using the relatively longer third timeout boundary allows the system to wait longer for the secondary storage controller to complete the transaction without assuming a network failure and unnecessarily retrying. It should be noted that it would be desirable in some cases to allow the user of the mirroring system to specify the length of the third timeout boundary. This allows the user to determine the desired balance between the time allowed for retries to complete and the resulting delay that could occur. Specifically, by allowing the user to either limit or extend the default timeout boundaries for network failures/congestion and/or remote storage delays based upon their performance requirements and their requirements for resiliency.

For example, in a typical system the length of the third timeout boundary may be user configurable between 15 and 60 seconds, allowing the user to determine how long the host system will allow a write operation to complete before the host system declares the I/O timed out and will post an error and initiate retry. This allows some users (e.g., users that view a relatively short delay, even temporarily, as being unacceptable) to select a relatively short third timeout boundary. And it allows other users (e.g., users that view their mirroring functions as very important and would want to preserve it if at all possible) to select a relatively long third timeout boundary. Of course, the range of between 15 and 60 seconds is just one example, and other ranges could instead be used.

Figure 3:
FIG. 3 is a flow diagram illustrating a first exemplary method for transmitting data from a primary storage controller to a secondary storage controller.

Turning now to FIG. 3, a first method 300 for transmitting data from a primary storage controller to a secondary storage controller is illustrated. In the method 300 the primary storage controller is connected to the secondary storage controller by a plurality of links, including at least one link on a different network failure boundary from another link in the plurality of links. The first step 302 is to transmit a first transaction from the primary storage controller to the secondary storage controller. This can be accomplished using a peer-to-peer remote copy write command. In the next step 304 the first transaction crosses a first timeout boundary, indicating that an error or unacceptable delay has occurred before the first transaction has completed. Then, in response to the first transaction crossing a first timeout boundary without completing, the next step 306 is to transmit a second transaction from the primary storage controller to the secondary storage controller using a second of the plurality of links, the second of the plurality of links preferentially selected to be on a different network failure boundary from the first of the plurality of links. As was described above, preferentially selecting links on a different network failure boundary for the transmitting of additional transactions can improve the performance of the system by decreasing the probability of delay in the completing these additional transactions.

Figure 4:
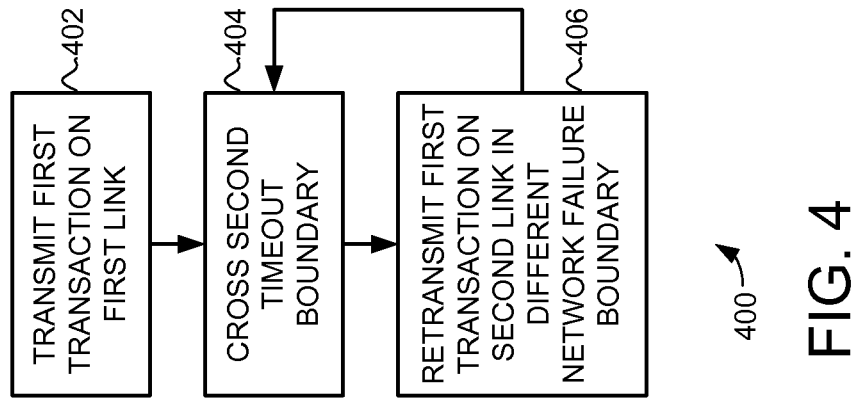
FIG. 4 is a flow diagram illustrating a second exemplary method for transmitting data from a primary storage controller to a secondary storage controller.

Turning now to FIG. 4, a second method 400 for transmitting data from a primary storage controller to a secondary storage controller is illustrated. In the method 400 the primary storage controller is connected to the secondary storage controller by a plurality of links, including at least one link on a different network failure boundary from another link in the plurality of links. The first step 402 is to transmit a first transaction from the primary storage controller to the secondary storage controller. Again, this can be accomplished using a peer-to-peer remote copy write command. In the next step 404 the first transaction crosses a second timeout boundary, indicating that an error has occurred before the first transaction has completed. Then, in response to the first transaction crossing a second timeout boundary without completing, the next step 406 is to retransmit the first transaction from the primary storage controller to the secondary storage controller using the second of the plurality of links, the second of the plurality of links preferentially selected to be on a different network failure boundary from the first of the plurality of links. This process then returns to step 404, where again if the second timeout boundary is crossed without completing at step 406 the first transaction is again retransmitted. And again in step 406 the link for the retransmission is preferentially selected to be on a different network failure boundary than the previously tried links.

As will be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer-readable medium(s) having computer readable program code embodied thereon.

Any combination of one or more computer-readable medium(s) may be utilized. A computer readable storage medium may be, for example, but not limited to, an electronic, magnetic, optical, crystal, polymer, electromagnetic, infrared, or semiconductor system, apparatus, or device, or any suitable combination of the foregoing. Examples of a computer-readable storage medium include, but are not limited to, an electrical connection having one or more wires, a portable computer diskette, a hard disk, RAM, ROM, an EPROM, a Flash memory, an optical fiber, a CD-ROM, an optical storage device, a magnetic storage device, or any suitable combination of the foregoing. In the context of this document, a computer-readable storage medium may be any tangible medium that can contain, or store a program or data for use by or in connection with an instruction execution system, apparatus, or device.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

The invention claimed is:

1. A method for transferring data from a primary storage controller to a secondary storage controller linked to the primary storage controller by a plurality of links, the method comprising:
   transmitting a first transaction from the primary storage controller to the secondary storage controller using a first of a plurality of links, where the plurality of links includes at least two links implemented with at least one different network hardware component such that the at least two links are on different network failure boundaries;
   in response to the first transaction crossing a first timeout boundary without completing:
      transmitting a second transaction from the primary storage controller to the secondary storage controller using a second of the plurality of links, the second of the plurality of links preferentially selected to be on a different network failure boundary from the first of the plurality of links; and
   in response to an indication that the first transaction reached the secondary storage controller but failed to complete in a timely manner:
      retransmitting the first transaction from the primary storage controller to the secondary storage controller using the first of the plurality of links and using a third timeout boundary, the third timeout boundary longer than the first timeout boundary.

2. The method of claim 1 further comprising:
   in response to the first transaction crossing a second timeout boundary without completing:
      retransmitting the first transaction from the primary storage controller to the secondary storage controller using the second of the plurality of links, the second of the plurality of links preferentially selected to be on a different network failure boundary from the first of the plurality of links.

3. The method of claim 2 further comprising:
   in response to the retransmitting of the first transaction again crossing the second timeout boundary without completing:
      continuing retransmitting the first transaction from the primary storage controller to the secondary storage controller using selected other of the plurality of links, the selected other of the plurality of links preferentially selected to try one link in each network failure boundary.

4. The method of claim 3 further comprising:
   suspending transferring data from the primary storage controller to the secondary storage controller after one link in each network failure boundary has been tried for retransmission.

5. The method of claim 2 further comprising:
   in response to the retransmitting of the first transaction again crossing the second timeout boundary without completing:
      retransmitting the first transaction from the primary storage controller to the secondary storage controller using a third of the plurality of links, the third of the plurality of links preferentially selected to be on a different network failure boundary from the first of the plurality of links and the second of the plurality of links.

6. The method of claim 1 wherein the third timeout boundary is selectable by a user.

7. The method of claim 1 wherein the indication that the first transaction reached the secondary storage controller but failed to complete in a timely manner comprises a specific error message from the secondary storage controller indicating that the transaction is delayed.

8. A primary storage controller operable by a processor, the primary storage controller linked to a secondary storage controller by a plurality of links, where the plurality of links includes at least two links implemented with at least one different network hardware component such that the at least two links are on different network failure boundaries, wherein the primary storage controller is configured to:
   in response to the first transaction crossing a first timeout boundary without completing:
      transmit a second transaction from the primary storage controller to the secondary storage controller using a second of the plurality of links, the second of the plurality of links preferentially selected to be on a different network failure boundary from the first of the plurality of links; and
   in response to an indication that the first transaction reached the secondary storage controller but failed to complete:
      retransmit the first transaction from the primary storage controller to the secondary storage controller using the first of the plurality of links and using a third timeout boundary, the third timeout boundary longer than the first timeout boundary.

9. The primary storage controller of claim 8 wherein the primary storage controller is further configured to:
   in response to the first transaction crossing a second timeout boundary without completing:
      retransmit the first transaction from the primary storage controller to the secondary storage controller using the second of the plurality of links, the second of the plurality of links preferentially selected to be on a different network failure boundary from the first of the plurality of links.

10. The primary storage controller of claim 9 wherein the primary storage controller is further configured to:
    in response to the retransmitting of the first transaction again crossing the second timeout boundary without completing:
       continue to retransmit the first transaction from the primary storage controller to the secondary controller using selected other of the plurality of links, the links selected to try one link in each network failure boundary.

11. The primary storage controller of claim 10 wherein the primary storage controller is further configured to:
    suspend transferring data from a primary storage controller to a secondary storage controller after one link in each network failure boundary has been tried for retransmission.

12. The primary storage controller of claim 9 wherein the primary storage controller is further configured to:
    in response to the retransmitting of the first transaction again crossing the second timeout boundary without completing:
       retransmit the first transaction from the primary storage controller to the secondary storage controller using a third of the plurality of links, the third of the plurality of links preferentially selected to be on a different network failure boundary from the first of the plurality of links and the second of the plurality of links.

13. The primary storage controller of claim 8 wherein the third timeout boundary is selectable by a user.

14. The primary storage controller of claim 8 wherein the indication that the first transaction reached the secondary storage controller but failed to complete comprises an error message from the secondary storage controller.

15. A storage system, comprising:
a primary storage controller operable by a processor;
a secondary storage controller;
a plurality of links linking the primary storage controller to the secondary storage controller, where the plurality of links includes at least two links implemented with at least one different network hardware component such that the at least two links are on different network failure boundaries
wherein the primary storage controller is configured to:
in response to the first transaction crossing a first timeout boundary without completing:
transmit a second transaction from the primary storage controller to the secondary storage controller using a second of the plurality of links, the second of the plurality of links preferentially selected to be on a different network failure boundary from the first of the plurality of links;
in response to the first transaction crossing a second timeout boundary without completing:
retransmit the first transaction from the primary storage controller to the secondary storage controller using the second of the plurality of links, the second of the plurality of links preferentially selected to be on a different network failure boundary from the first of the plurality of links; and
in response to an error message from the secondary storage controller indicating that the first transaction reached the secondary storage controller but failed to complete:
retransmit the first transaction from the primary storage controller to the secondary storage controller using the first of the plurality of links and using a third timeout boundary, the third timeout boundary longer than the first timeout boundary, and wherein the third timeout boundary is selectable by a user.

16. The storage system of claim 15 wherein the primary storage controller is further configured to:
in response to the retransmitting of the first transaction again crossing the second timeout boundary without completing:
continue to retransmit the first transaction from the primary storage controller to the secondary storage controller using selected other of the plurality of links, the selected other of the plurality of links preferentially selected to try one link in each network failure boundary; and
suspend transferring data from a primary storage controller to a secondary storage controller after one link in each network failure boundary has been tried for retransmission.

17. The storage system of claim 15 wherein the primary storage controller is further configured to:
in response to the retransmitting of the first transaction again crossing the second timeout boundary without completing:
retransmit the first transaction from the primary storage controller to the secondary storage controller using a third of the plurality of links, the third of the plurality of links preferentially selected to be on a different network failure boundary from the first of the plurality of links and the second of the plurality of links.

* * * * *